(12) United States Patent
Leonard

(10) Patent No.: US 7,671,798 B2
(45) Date of Patent: Mar. 2, 2010

(54) METHOD AND APPARATUS FOR OPTIMAL COMBINING OF NOISY MEASUREMENTS

(75) Inventor: Eric David Leonard, Morris Township, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 294 days.

(21) Appl. No.: 11/818,536

(22) Filed: Jun. 14, 2007

(65) Prior Publication Data

US 2008/0204320 A1      Aug. 28, 2008

Related U.S. Application Data

(60) Provisional application No. 60/904,095, filed on Feb. 28, 2007.

(51) Int. Cl.
*H04B 7/00*     (2006.01)

(52) U.S. Cl. ........................................ 342/368; 342/174

(58) Field of Classification Search ................. 342/368, 342/174

See application file for complete search history.

(56) References Cited

U.S. PATENT DOCUMENTS

| 6,693,588 | B1 | 2/2004 | Schlee |
| 2004/0174298 | A1 | 9/2004 | Eriksson |
| 2008/0303742 | A1* | 12/2008 | Dybdal et al. ............... 343/893 |

* cited by examiner

*Primary Examiner*—Thomas H Tarcza
*Assistant Examiner*—Fred H Mull
(74) *Attorney, Agent, or Firm*—Fay Sharpe LLP

(57) ABSTRACT

A method and system for optimally combining noisy measurements of attributes to obtain a composite statistically useful attribute result is disclosed. The method includes measuring a signal to noise ratio for each carrier in a pair, computing a signal to noise ratio power which is derived from said signal to noise ratio of each carrier in the pair and adding said signal to noise ratio powers that have been received within a predetermined period of time until the sum of said signal to noise ratio powers reaches a first threshold. The method continues with computing a weight based on the percentage of each measurements signal to noise ratio power in relation to said sum of said signal to noise ratio powers and deriving a statistically useful attribute result based at least in part on said weight of each signal to noise ratio power.

20 Claims, 2 Drawing Sheets

METHOD AND APPARATUS FOR OPTIMAL COMBINING OF NOISY MEASUREMENTS

CROSS REFERENCE TO RELATED APPLICATIONS

This application claims the benefit of U.S. Provisional Application No. 60/904,095 filed Feb. 28, 2007, which is hereby incorporated by reference herein.

BACKGROUND OF THE DISCLOSURE

This disclosure relates to a method and apparatus for calibrating intelligent antennas in a telecommunications network. More particularly, this disclosure relates to a method and apparatus for optimally combining noisy calibration measurements in order to obtain a composite statistically useful result.

While the disclosure is particularly directed towards intelligent antenna calibration, and will be thus described with specific reference thereto, it will be appreciated that the disclosure may have usefulness in other fields and applications. For example, this disclosure may be used for a variety of calibration techniques and/or methods.

By way of background, intelligent antennas are antennas that are used in radio communication systems that may alter the phase of a signal in order to steer it in an optimal direction. In order to steer the signal in the proper direction, it is important to know the differences in the few attributes of the pairs of antenna. One way of doing this is to calibrate the separate antennas in order that we know the phase difference, the gain difference, and delay difference in each of the pairs of antenna.

In many systems, a low level calibration signal is sent to each of the antennas in order to define these attributes. The calibration signal is often sent at a very low level in order to not interfere with the communication signals. Once the calibration signal is returned, a measurement is taken in order to determine the calibration offsets.

Because these antennas are physically in different locations, an identical signal sent to each antenna will have inherent differences. This is mostly due to the cables connecting them. The calibration signal is sent out in order to determine these differences and offer corrections for them. However, because these calibration signals are sent at a very low power, it is often the case that noise will interfere with the calibration signal. When noise interferes with this calibration signal the reading is often inaccurate and not reliable. Unfortunately, in order to properly calibrate these intelligent antenna a certain level of accuracy is required. When the Signal to Noise Ratio (SNR) is too low, the reading must be disregarded and another one must be taken.

Significant time and energy is spent sending and receiving low level calibration signals that cannot be used due to noise. Therefore, there is a need in the industry to find a use for low level calibration signals with a relatively low SNR. Furthermore, there is a need in the industry for a system and method that makes calibration techniques more efficient.

The present disclosure contemplates a new and improved system and method that resolves the above-referenced difficulties and others.

SUMMARY OF THE INVENTION

A method and apparatus for optimally combining noisy measurements of attributes to obtain a composite statistically useful attribute result is disclosed. This disclosure allows for a weighted system for combining otherwise failing calibration scores. This optimally weights calibration scores that would otherwise fail, and makes them into useful scores.

In one aspect of the disclosure, the method includes measuring a signal to noise ratio for each antenna in a pair, computing a signal to noise ratio power which is derived from the signal to noise ratio of each antenna in the pair adding the signal to noise ratio powers that have been received within a predetermined period of time until the sum of the signal to noise ratio powers reaches a first threshold, computing a weight base on the percentage of each measurement's signal to noise ratio power in relation to said sum of said signal to noise ratio powers, and deriving a statistically useful attribute result based at least in part on said weight of each signal to noise ratio power.

In accordance with another aspect of the present disclosure, the method further comprises that if the sum of the signal to noise ratio powers that have been received within the predetermined period of time do not reach a first threshold, then deriving the statistically useful attribute result based at least in part on the weight of each signal to noise ratio power if the signal to noise ratio power reaches a second threshold.

In another aspect of the present disclosure, the method includes that the attribute is a phase delta.

According to another aspect of the present disclosure, the method includes that the attribute is a gain ratio.

In another aspect of the present disclosure, the method includes that the attribute is a delay.

In yet another aspect of the present disclosure, the system includes a radio configured to eject a calibration signal for each antenna for a pair of associated beam steering antenna, a measurement module in the radio configured to measure the calibration signal and derive signal to noise ratio for the calibration signal, a database that stores the measured signal to noise ratio, and a master controller configured to add the signal to noise ratio powers that have been received within a predetermined amount of time until the sum of the signal to noise ratio powers reaches a first threshold, compute a weight based on the percentage of each measurement signal to noise ratio power in relation to the sum of the signal to noise ratio powers and derive a statistically useful attribute result based at least in part on the weight of each of the signal to noise ratio powers.

In accordance with another aspect of the present disclosure, the system includes a channel card configured to generate signals of different phases between two associated antenna.

In accordance with another aspect of the present disclosure, the system includes a calibration signal that is sent through the air.

In accordance with another aspect of the present disclosure, the system includes that the attribute is a phase delta, gain ratio, or a delay.

In accordance with another yet aspect of the present disclosure, a method for optimally averaging intelligent antenna results includes transmitting a calibration signal for each antenna of a pair, measuring attributes of a calibration signal, calculating a signal to noise ratio power that is associated with the measured attribute, storing the measured attribute, storing the signal to noise ratio in a database and if the signal to noise ratio power is below a predetermined threshold, adding the signal to noise ratio power to the next most recent measured signal to noise ratio power until the sum of the signal to noise ratio power reaches the predetermined first threshold. However, if there are no more measured signal to noise ratio powers and the sum of the most recent measured signal to noise ratio powers is below a second threshold, disregard the sum of the signal to noise ratio powers. But, if the sum of the signal to noise ratio powers reaches the first threshold or if there are no more measured signal to noise ratio powers, and the sum of the most recent measured signal to noise ratio powers reaches a second threshold, deriving a composite attribute result based at least in part on the weight to each of signal to noise ratio powers associated with the measured attribute.

In accordance with another aspect of the claimed disclosure, the method includes that the calibration signal be sent through the air.

In accordance with another aspect of the present disclosure, the method includes that the most recent measured signal to noise ratio powers were measured within a predetermined amount of time.

In accordance with another aspect of the present disclosure, the method includes that weight is based at least in part upon the percentage of signal to noise ratio power in relation to the sum of the signal to noise ratio powers.

In accordance with another aspect of the present disclosure, the method includes that the attribute is a phase delta, amplitude/ gain ratio and/or a delay.

DESCRIPTION OF THE DRAWINGS

The presently described embodiments exist in the construction, arrangement, and combination of the various parts of the device, and steps of the method, whereby the objects contemplated are attained as hereinafter more fully set forth, specifically pointed out in the claims, and illustrated in the accompanying drawings in which:

DETAILED DESCRIPTION

Figure 1:
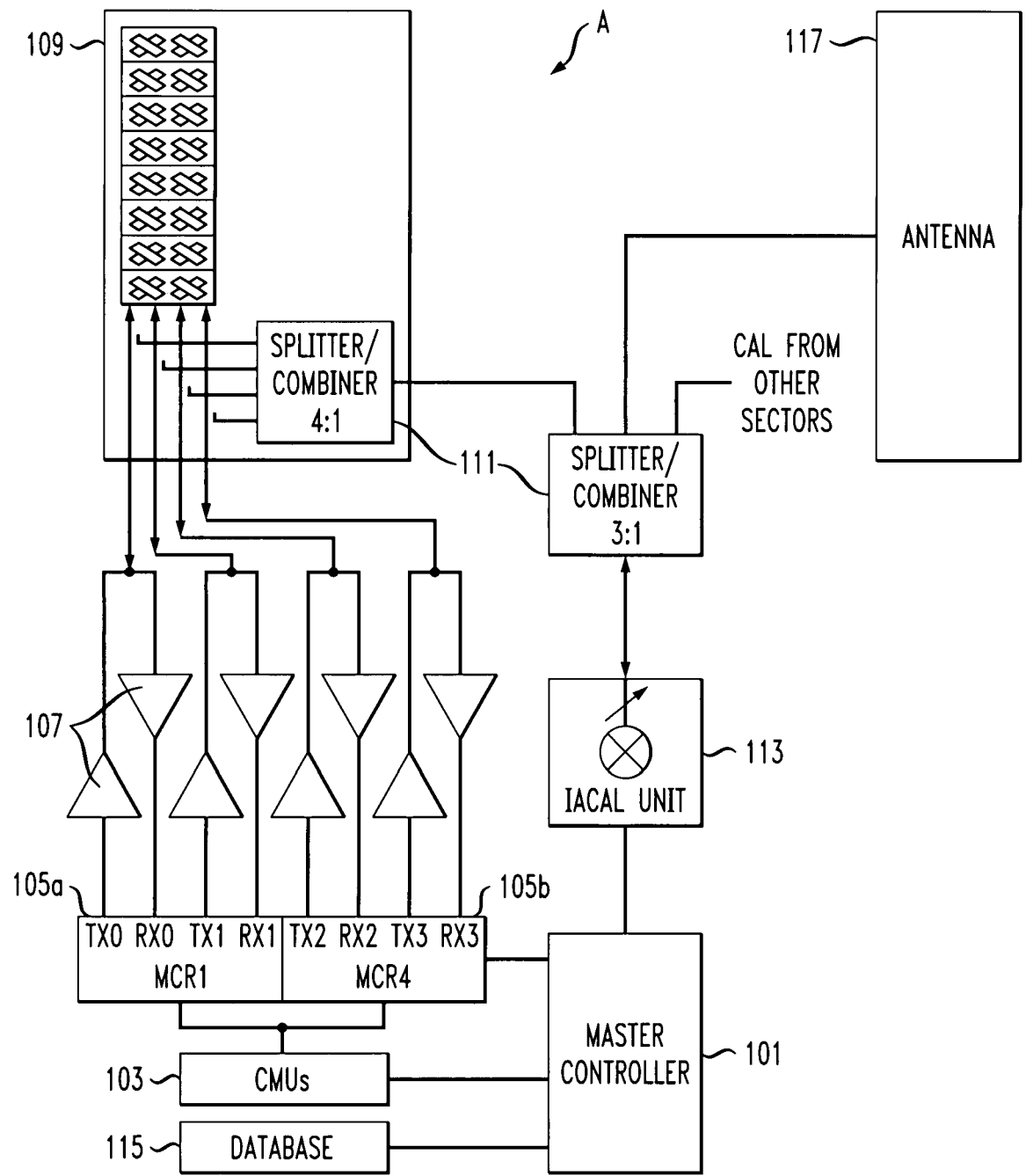
FIG. 1 illustrates a portion of the overall communications network including a master controller and an intelligent antenna.

Referring now to the drawings wherein the showings are for purposes of illustrating the exemplary embodiments only and not for purposes of limiting the same, FIG. 1 provides an overall view of the system in which the presently described embodiments may be incorporated. The communications infrastructure A is shown. The infrastructure includes a master controller 101, a modem unit 103, a plurality of radios 105a and 105b, amplifiers 107, an antenna 109, splitters and combiners 111, an IA CAL unit 113 and a database 115.

It should be noted that these elements are but one embodiment of the disclosure. These network elements may be configured in a number of ways and still fall within the spirit and scope of the claims. Furthermore, they may also act in conjunction or be divided amongst each other. Some components may not necessary in certain situations.

In operation, as described in greater detail below, the presently described embodiments are directed towards a system and a method for optimally combining noisy measurements of attributes in order to obtain a useful attribute result. This disclosure thus describes a solution to the current problem of obtaining noisy signals that are intended to be used for calibration. These noisy signals by themselves are too statistically inaccurate in order to be used. This disclosure is a system and a method for combining these noisy measurements and turning them into a useful result.

Still referring to FIG. 1, the system disclosed is used for gathering calibration signals. The modem unit 103 is connected to a plurality of radio units 105a, 105b. The radio units 105a, 105b are configured to send a signal through amplifiers to an intelligent antenna 109. The intelligent antenna 109 may send the signals to splitter/combiners 111 and finally to an IA CAL unit 113. The master controller 101 is in communication with all of these elements as well as a database 115. Continuing on with FIG. 1, this embodiment includes a modem unit 103 which is configured to receive an incoming signal. The modem unit 103 may include T1 info and modulation info which is then set to the radio 105a, 105b. These radios 105a, 105b, send the signal through amplifiers 107 and eventually to the intelligent antenna 109.

The radios 105a, 105b generate the calibration signal, measures the calibration signal, sends those measurements to the master controller. The radios 105a, 105b also receive gain, phase, and delay adjustment values from the master controller and make the requested adjustments to the Radio Frequency (RF) signals that they are processing in the downlink direction.

During calibration it may be the case that the entire signal is not broadcast to the mobile. Instead a small portion of the signal will head to the splitter/combiner 111. As the signal goes towards the IA CAL unit 113, all four signals, which initiated at the four ports of the radios 105a, 105b, are combined at the splitter/combiner 111. This is also combined with calls from the other sectors from other antenna 117 which are not shown in detail. That signal may then be sent down to the IA CAL unit 113.

It should be noted that only the master antenna would have the 3:1 splitter combiner 111. The 3:1 splitter combiner would combine the signals from master antenna and the two slave antennas. For simplification purposes, FIG. 1 shows only one antenna, however, it should be noted that there may be other antennas.

The signal eventually reaches the IA CAL unit 113. The IA CAL unit 113 converts the signal from a down link signal to an uplink signal. Once the signal changes frequency, the IA CAL unit 113 may also add an attenuation in order to maintain the signal at a usable level.

The IA CAL unit 113 may then send the frequency back up towards the radios 105a, 105b, via the same bidirectional line. In this form the 3:1 splitter/combiner splits the signal off into the master antenna and slave antennas. A similar situation takes place at the 4:1 splitter/combiner 111. In this form the signal is split into four different signals in the antenna 109. As shown the radios 105a, 105b are each going to get an exact copy of the signal with the exception being where the signal is split. Where the signal is split the copy will not be a perfect carbon copy because the signal is taking the various paths.

In route though this procedure, the calibration signal may have received too much noise in order for it to get a useful calibration measurement. However, through this disclosure that measurement would be stored in the database 115, regardless of its statistical significance. The master controller 101 may be in communication with the database 115 in order to receive this information. The master controller 101 is then used to compute the SNRs for the database 115. Every time a calibration cycle is complete, an SNR value expressed in dB is available for every TX and RX pair of every carrier for a given sector. First, it is necessary to compute the phase delta SNR (expressed as a power ratio). Consider one pair whose SNR values are $SNRDb_1$ and $SNRDb_2$.

First compute the composite variance as $$CompVar = \frac{10^{(-SnrDb_1/10)} + 10^{(-SnrDb_2/10)}}{2}.$$

SNR expressed as a power ratio is then $$SnrPwr_{PhaseDelta} = \frac{1}{CompVar}.$$

This value, and the phase delta (i.e. the phase delta that we would have if all phase adjustments on the MCR(s) were 0) are then stored in the table if $SnrPwr \geq 10^{(16/10)}$. Otherwise, the table is left unmodified. Note that this 16 dB threshold as well as a table size of 20 is a current working view and subject to change. Note that a table size of 20 was chosen because 20 entires with minimal SNR (i.e. 16 dB) can be averaged together to obtain a composite entry whose SNR is 29 dB (our target SNR.)

Starting with CompositeSnrPwr equal to 0 and enter a loop. If our first entry doesn't exist or is more than 12 hours old, we exit the loop with counter c=0. (Note that c represents how many entries were needed to create the final value of CompositeSnrPwr). Otherwise, we add the SnrPwr of that entry to CompositeSnrPwr. If the new value of CompositeSnrPwr $\geq 10^{(29/10)}$, we exit the loop with c=1.

If the method is still in the loop, then we look at the second most recent entry. If none exists or this entry is more than 12 hours old, we exit the loop with c=1. Otherwise, we add the SnrPwr of this entry to CompositeSnrPwr. If the new value of CompositeSnrPwr $\geq 10^{(29/10)}$, then the program exits the loop with c=2. This method continues until the program exits the loop.

Upon exiting the loop, if CompositeSnrPwr $< 10^{(29/10)}$, then there is an error and the program exits out of beamsteering mode on all carriers for that sector. The process of updating all table entries continues for this and future calibration cycles.

If CompositeSnrPwr $\leq 10^{(29/10)}$, we now compute the composite angle from the c most recent entries as $$\Delta\theta_{est} = \sum_{i=1}^{c} w_i * \Delta\theta_{i\_est},$$

where $$w_i = \frac{SnrPwr_{i\_PhaseDelta}}{CompositeSnrPwr}.$$

It should be noted that there may be wrapping effects associated with this equation. For example, if we applied equal weights in a case where $\Delta\theta_{1\_est}=1$ degree and $\Delta\theta_{2\_est}=359$ degrees, we would clearly desire a result of 0 degrees, not (1+359)/2=180 degrees. This could be done by redefining 359 degrees as −1 degrees.

For example, assuming that we have amplitude ratio estimates $AmpRatio_{Est1}, \ldots, AmpRatio_{n\_est}$ with corresponding variances $\phi_0^{12}, \ldots, \phi_n^2$. For i=1 to n, we then have $$AmpRatio_{i\_est} = AmpRatio + \phi_i * N_i$$

where AmpRatio is the ideal "noiseless" amplitude ratio and $N_i$ are independent, zero mean Gaussian random variables with unit variance. Note that for this analysis, it is assumed that AmpRatio is constant over all of the measurements. This method seeks a composite amplitude ratio that is a linear combination of the n estimates that has an expected value of AmpRatio and a minimum variance. This should yield the best possible composite estimate.

This linear combination can be expressed as $$\sum_{i=1}^{n} w_i * AmpRatio_{i\_est} = \sum_{i=1}^{n} w_i * AmpRatio + \sum_{i=1}^{n} w_i * \phi_i N_i$$

where $w_i$ are the weights that need to be determined. The first summation yields the expected value. In order for this expected value to equal AmpRatio, the sum of the weights must equal 1.

The second summation contains all of the noise terms. The composite variance of this summation is $$\sum_{i=1}^{n} w_i^2 \phi_i^2.$$

Comparing the phase delta variance equation with the gain ratio variance equation it is found that they each only differ by the constant factor $$\left(\frac{AmpLin_2}{AmpLin_1}\right)^2.$$

Hence, the same weights that minimize the composite variance in one case also minimize it in the other. Therefore, the results here are the same as the results stated earlier, but are repeated below for clarity.

Using Lagrange multipliers to minimize this composite variance subject to the sum of the weights equaling 1, we obtain weights of $$w_j = \frac{1/\phi_j^2}{\sum_{i=1}^{n} 1/\phi_i^2}.$$

Putting these optimal weights into our equation for composite variance, we get $$composite\_variance = \frac{1}{\sum_{i=1}^{n} 1/\phi_i^2}.$$

For the case where we would allow SNRs of 26 dB, we would accept an estimate where the variance of the gain ratio was less than or $$equal\ to \left(\frac{AmpLin_2}{AmpLin_1}\right)^2 10^{-(26/10)}.$$

Analogously, the multiple estimates are combined and the method may allow for a composite estimate whose composite variance is less than $$\left(\frac{AmpLin_2}{AmpLin_1}\right)^2 10^{-(26/10)}.$$

This would yield $$\frac{1}{\sum_{i=1}^{n} 1/\phi_i^2} \leq \left(\frac{AmpLin_2}{AmpLin_1}\right)^2 10^{-(26/10)}$$

or $$\sum_{i=1}^{n} 1/\phi_i^2 = \sum_{i=1}^{n} SnrPwr_{i\_GainRatio} \geq \left(\frac{AmpLin_1}{AmpLin_2}\right)^2 10^{(26/10)}.$$

But, $$SnrPwr_{i\_GainRatio} = \left(\frac{AmpLin_1}{AmpLin_2}\right)^2 * SnrPwr_{i\_PhaseDelta}$$

Hence, the requirement becomes $$\left(\frac{AmpLin_1}{AmpLin_2}\right)^2 * \sum_{i=1}^{n} SnrPwr_{i\_PhaseDelta} \geq \left(\frac{AmpLin_1}{AmpLin_2}\right)^2 10^{(26/10)}$$

or $$\sum_{i=1}^{n} SnrPwr_{i\_PhaseDelta} \geq 10^{(26/10)}$$

However, this is the same constraint equation that was derived in finding an optimal combination of high variance phase delta estimate. Hence, both the phase delta and the gain ratio have the same SNR requirements.

Likewise, the constraint to meet or exceed the case where both paths are 29 dB is $$\sum_{i=1}^{n} SnrPwr_{i\_PhaseDelta} \geq 10^{(29/10)}$$

$$\sum_{i=1}^{n} SnrPwr_{i\_PhaseDelta} \geq 10^{(29/10)}.$$

For each entry, we compute and store the linear gain ratio as $$GainRatioLinear_{i\_est} = 10^{((GainDb2_{i\_est} - GainDb1_{i\_est})/20)}.$$

The master controller 101 may then be used to compute composite gain ratio from the database creating by looping through the CompositeSnrPwr entries in the table. The loop only needs to be run once. The computed weights can then be used for both applications. After exiting the loop, we do the following.

Upon exiting the loop, if CompositeSnrPwr<$10^{(29/10)}$, the method has an error and go out of beamsteering mode on all antennas for that sector. We do, however, continue updating all table entries as a result of this and future calibration cycles.

If CompositeSnrPwr<=$10^{(29/10)}$, compute the composite gain ratio from the most recent entries as $$GainRatioLinear_{est} = \sum_{i=1}^{c} w_i * GainRatioLinear_{i\_est}, \text{ where}$$

$$w_i = \frac{SnrPwr_i}{CompositeSnrPwr}.$$

Finally, this result needs to be converted back to dB by using the following equation . . .

$$GainRatioDb_{est} = 20 * \log_{10}(GainRatioLinear_{est})$$

The master controller 101 may then be used in order to computer averaging delays. The same weights can be used for delay averaging as are used for gain and phase averaging.

As shown above, the weights that are computed for phase and gain are a function of the SNRs of BOTH ports since the calculated phase deltas and gain ratios use data from both ports. Delay averaging, however, is done separately for each port. Strictly speaking, the weights for each port should just depend on the SNR for that port. Implementing the method, however, may be greatly simplified if we can use the same weights for delay averaging that we do for gain and phase averaging.

In case of noise rise due to external source, the SNRs of both ports of an MCR should move up and down together. This implies that port 1 and port 2 SNRs should remain proportional to the combined SNRs that are used to compute weights for phase and gain. As a result, weights generated in the following three ways should be roughly the same.

Weights generated by exclusively using port 1 SNRs.
Weights generated by exclusively using port 2 SNRs.
Weights generated by exclusively using combined port 1 and port 2 SNRs, i.e. the weights currently used for phase and gain averaging.

To ease implementation, we will therefore use the same weights for delay averaging that are currently used for phase and gain averaging. It is hoped that the numerical example provided below will make the implementation of this clear.

Finally, note that the delays that are stored in the table and later averaged, must have all MCR delay offsets removed from them. Weights may also be computed in the master controller 101.

Assuming that all entries in the following table are within the previous 12 hours, the following would apply. Note that only shaded entries are actually stored in the table. Non-shaded entries represent the raw data that was returned from each estimation. In this table, measurement #3 is the most recent entry.

| Measurement Number | SNRDb1 | SNRDb2 | SnrPwr |
|---|---|---|---|
| 3 | 23.7 | 24.1 | 245 |
| 2 | 23.2 | 23.6 | 219 |
| 1 | 16 | 16 | 40 |

The fourth measurement now arrives with SNRDb1=25.5, SNRDb2=26.5.

We compute $$CompVar = \frac{10^{(-25.5/10)} + 10^{(-26.5/10)}}{2} = .002529.$$

Then $$SnrPwr = \frac{1}{.00259} = 395.$$

The table entries for computing the weights now become.

| Measurement Number | SNRDb1 | SNRDb2 | SnrPwr |
|---|---|---|---|
| 4 | 25.5 | 26.5 | 395 |
| 3 | 23.7 | 24.1 | 245 |
| 2 | 23.2 | 23.6 | 219 |
| 1 | 16 | 16 | 40 |

Note that our threshold SnrPwr for exiting the loop is $10^{29/10} = 794$.

We enter the loop with CompositeSnrPwr=0, and start with our most recent measurement, measurement #4. This measurement has an SnrPwr of 395, so we add that to CompositeSnrPwr to obtain a CompositeSnrPwr of 395. Since 395<794, we add in measurement #3 to get CompositeSnrPwr=395+245=640. Since 640<794, we add in measurement #2 to get CompositeSnrPwr=640+219=859. Since 859>794, we exit the loop with c, our estimate counter equal to 3. Note that measurement #1 never gets used here.

Since CompositeSnrPwr=859>$10^{26/10}$=398, we can successfully perform our composite estimates as shown in the next subsections. The weight for measurement #4 is $$\frac{SnrPwr4}{CompositeSnrPwr} = \frac{395}{859} = .4598.$$

Likewise, our weights for measurements #3 and #2 are 0.2852 and 0.2549 respectively.

These weights will be used in the subsequent subsections for computing phase delta, gain ratios, and delays estimates.

Using the weights as detailed above, the master controller 101 may then use these weights in order to compute a useful composite phase delta.

We add phase information to the initial table shown in section to obtain the following table.

| Measurement Number | SNRDb1 | SNRDb2 | SnrPwr | Phase1 (deg) | Phase2 (deg) | Phase Delta |
|---|---|---|---|---|---|---|
| 3 | 23.7 | 24.1 | 245 | 50 | 100.1 | 50.1 |
| 2 | 23.2 | 23.6 | 219 | 165.3 | 210.6 | 45.3 |
| 1 | 16 | 16 | 40 | 325 | 20 | 55 |

The fourth measurement now arrives with SNRDb1=25.5, SNRDb2=26.5, Phase1=33.2, and Phase2=80.6.

Our phase delta is 80.6−33.2=47.4. Using the SnrPwr computed above, we add this fourth estimate to create the following new table.

| Measurement Number | SNRDb1 | SNRDb2 | SnrPwr | Phase1 (deg) | Phase2 (deg) | Phase Delta |
|---|---|---|---|---|---|---|
| 4 | 25.5 | 26.5 | 395 | 33.2 | 80.6 | 47.4 |
| 3 | 23.7 | 24.1 | 245 | 50 | 100.1 | 50.1 |
| 2 | 23.2 | 23.6 | 219 | 165.3 | 210.6 | 45.3 |
| 1 | 16 | 16 | 40 | 325 | 20 | 55 |

As shown, we compute weights of 0.4598, 0.2852, and 0.2549 for measurements 4, 3, and 2 respectively. Applying these weights to obtain the overall estimate for phase delta, the result is $\Delta\theta_{est} \rightarrow 0.4598*47.4+0.2852*50.1+ 0.2549*45.3=47.63$ degrees.

We add gain information to the initial table to obtain the following table.

| Measurement Number | SNRDb1 | SNRDb2 | SnrPwr | GainDb1 | GainDb2 | GainRatioLin |
|---|---|---|---|---|---|---|
| 3 | 23.7 | 24.1 | 245 | 69.3 | 71.2 | 1.245 |
| 2 | 23.2 | 23.6 | 219 | 68.6 | 69.7 | 1.135 |
| 1 | 16 | 16 | 40 | 70.2 | 70.5 | 1.035 |

The fourth measurement now arrives with SNRDb1=25.5, SNRDb2=26.5, GainDb1=69.5, and GainDb2=70.2.

We compute GainRatioLin=$10^{((70.2-69.5)/20)}$=1.084. Using the SnrPwr computed and add this fourth estimate to create the following new table.

| Measurement Number | SNRDb1 | SNRDb2 | SnrPwr | GainDb1 | GainDb2 | GainRatioLin |
|---|---|---|---|---|---|---|
| 4 | 25.5 | 26.5 | 395 | 69.5 | 70.2 | 1.084 |
| 3 | 23.7 | 24.1 | 245 | 69.3 | 71.2 | 1.245 |
| 2 | 23.2 | 23.6 | 219 | 68.6 | 69.7 | 1.135 |
| 1 | 16 | 16 | 40 | 70.2 | 70.5 | 1.035 |

As shown, we compute weights of 0.4598, 0.2852, and 0.2549 for measurements 4, 3, and 2 respectively. Applying these weights to obtain our composite estimate for the linear gain ratio, we obtain GainRatioLin$_{Est}$=0.4598*1.084+0.2852*1.245+ 0.2549*1.135=1.143 .

Converting to dB, we obtain

GainRatioDbEst=20*log10(1.143)=1.161 .

In the same manner, these numbers may also be used in order to compute a statistically useful composite delay.

We add gain information to the initial table shown to obtain the following table.

| Measurement Number | SNRDb1 | SNRDb2 | SnrPwr | Delay1 | Delay2 |
|---|---|---|---|---|---|
| 3 | 23.7 | 24.1 | 245 | 70 | 71 |
| 2 | 23.2 | 23.6 | 219 | 72 | 75 |
| 1 | 16 | 16 | 40 | 67 | 68 |

The fourth measurement now arrives with SNRDb1=25.5, SNRDb2=26.5, Delay1=68, and Delay2=73.

Using the SnrPwr computed, we add this fourth estimate to create the following new table.

| Measurement Number | SNRDb1 | SNRDb2 | SnrPwr | Delay1 | Delay2 |
|---|---|---|---|---|---|
| 4 | 25.5 | 26.5 | 395 | 68 | 73 |
| 3 | 23.7 | 24.1 | 245 | 70 | 71 |
| 2 | 23.2 | 23.6 | 219 | 72 | 75 |
| 1 | 16 | 16 | 40 | 67 | 68 |

Computing weights of 0.4598, 0.2852, and 0.2549 for measurements 4, 3, and 2 respectively. Applying these weights to obtain our composite estimates for delay1 and delay2, the result is Delay1$_{Est}$=round(0.4598*68+0.2852*70+ 0.2549*72)=70.

Delay2$_{Est}$=round(0.4598*73+0.2852*71+ 0.2549*75)=73.

Figure 2:
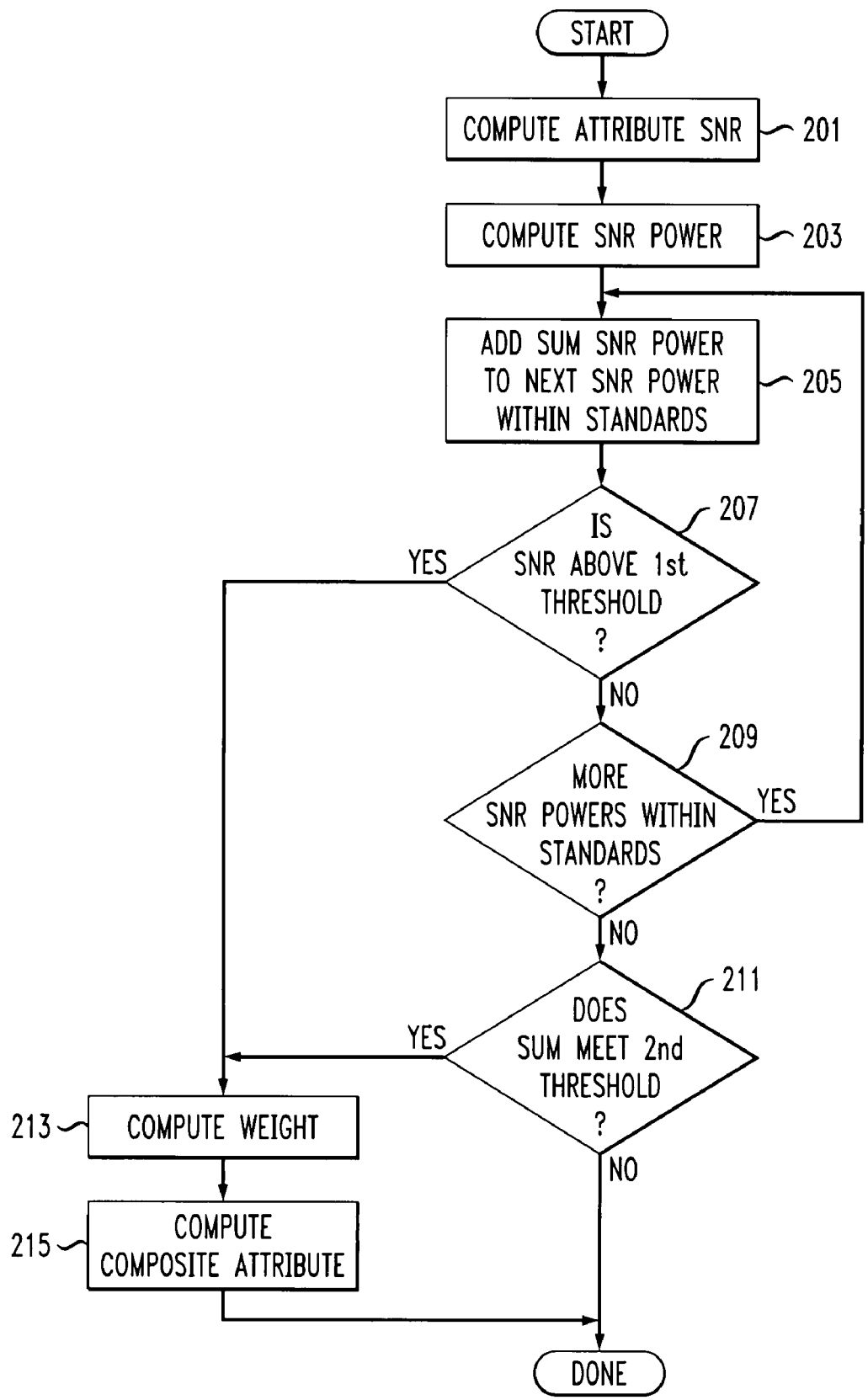
FIG. 2 is a flow chart illustrating one of the embodiments of the method according to the present disclosure.

Now referring to FIG. 2, which is a summary of the examples outlined above. FIG. 2 discloses the method for optimally averaging the intelligent antenna calibration results. In one form, all steps of the method are performed in the master controller 101. However, as is the case with any of these functions, implementation of the various network elements (both in hardware configurations and in software routines) depend on how the system is used. These functions may be performed by some or all of the network elements in conjunction or separate from one another. This is but one embodiment of the proposed system and variations to the system may exist.

The method beings with computing the attributes signal to noise ratio at step 201. The SNR is generally the useful signal divided by the amount of noise. The higher the signal to noise ratio the more useful the calibration signal is. This is because the more signal that is received, the more accurate the reading.

The next step in the method is to compute the signal to noise power at step 203. As was shown above, the signal to noise ratio power may be computed by using the inverse of the Comp Var.

The next step in the method is adding the signal to noise ratio powers to the previous signal to noise ratio power within standards at step 205. The standards may be dictated by time. One method of doing this is only storing recent data in the database. Once the data reaches a certain time threshold that entry may be deleted. Another form is simply time stamping the data entry and when an entry goes beyond a certain time threshold that data may no longer be used. It should however be noted, that in some embodiments a circular buffer is maintained thereby, limiting the number of entries stored.

The next step in the method at step 207 is figuring if the sum of the SnrPwrs has reached the first threshold. If it has, we continue to step 213. If it has not, query the system as to whether there are more SnrPwrs within the standard at step 209. If the answer is yes, we return to step 205 to add the sum of SnrPwrs to the next SnrPwr within standards and continue on.

If there are no more SnrPwrs that fit within the standards, then we check to see if the sum of the SnrPwrs meets the second threshold. The second threshold generally is not as high as the first threshold and when there is no more data to add to the equation, this is a measure to see if the data that has been collected is sufficient. However, because the first threshold is generally a higher standard, the data will be more accurate if the SnrPwrs have reached the first threshold and the answer to the query at step 207 is yes. In either situation, eventually we go to step 213 where we compute the weight. However, if the sum does not meet the second threshold, the data is not sufficiently useful and the composite attribute cannot be computed.

At step 213 if the sum of the SnrPwrs has reached the first threshold or if there are no more SnrPwrs within standards but the sum of the SnrPwrs does meet the second threshold the master controller 101 may then compute the weight. As explained in detail above, the weight may be computed by figuring the percentage of SnrPwr that each attribute has contributed to the sum of the SnrPwrs that have met either the first or second threshold.

Finally, at step 213, the weight is used in order to compute the composite attributes, which under this disclosure is a statistically significant figure.

The above description merely provides a disclosure of particular embodiments of the invention and is not intended for purposes of limiting the same thereto. As such, the disclosure is not limited to only the above-described embodiments. Rather, it is recognized that one skilled in the art could conceive alternative embodiments that fall within the scope of the invention.

I claim:

1. A method of optimally combining noisy measurements of attributes to obtain a composite statistically useful attribute result, said method comprising:
   measuring a calibration signal ejected by a radio for each carrier associated with a pair of beam steering antenna;
   computing a signal to noise ratio power for each carrier which is derived from the corresponding calibration signal;
   adding said signal to noise ratio powers that have been received within a predetermined period of time until the sum of said signal to noise ratio powers reaches a first threshold;

computing a weight based on the percentage of each measurement's signal to noise ratio power in relation to said sum of said signal to noise ratio powers; and deriving a statistically useful attribute result based at least in part on said weight of each signal to noise ratio power.

2. The method according to claim 1, further comprising if the sum of said signal to noise ratio powers that have been received within said predetermined period of time do not reach said first threshold, deriving said statistically useful attribute result based at least in part on the weight of each signal to noise ratio power if said signal to noise ratio powers reach a second threshold.

3. The method according to claim 1 wherein said attribute is a phase delta.

4. The method according to claim 1 wherein said attribute is a gain ratio.

5. The method according to claim 1 wherein said attribute is a delay.

6. A system for optimally combining measurements of intelligent antenna attributes, comprising:
  a radio configured to eject a calibration signal for each antenna of a pair of associated beam steering antenna;
  a measurement module configured to measure each calibration signal and derive a signal to noise ratio power for each corresponding calibration signal;
  a database that stores said derived signal to noise ratio powers; and
  a master controller configured to add said signal to noise ratio powers that have been received within a predetermined period of time until the sum of said signal to noise ratio powers reaches a first threshold, compute a weight based on the percentage of each measurements signal to noise ratio power in relation to said sum of said signal to noise ratio powers, and deriving a statistically useful attribute result based at least in part on said weight of each signal to noise ratio power.

7. The system according to claim 6 further comprising a channel card configured to generate signals of different phases between two associated antenna.

8. The system according to claim 6 further comprising a single cell site that houses said master controller and said radio.

9. The system according to claim 6 wherein said calibration signal is sent through the air.

10. The system according to claim 6 wherein said attribute is a phase delta.

11. The system according to claim 6 wherein said attribute is a gain ratio.

12. The system according to claim 6 wherein said attribute is a delay.

13. The system according to claim 6 wherein said database is configured to store said measured signal to noise ratios for a predetermined amount of time.

14. The system according to claim 6 wherein said database is configured to store a predetermined number of said measured signal to noise ratios.

15. A method for optimally averaging intelligent antenna results comprising:
  transmitting a calibration signal to each antenna of a pair;
  measuring attributes of said calibration signal;
  calculating a signal to noise ratio power that is associated with said measured attribute;
  storing said signal to noise ratio power in a database;
  if the signal to noise ratio power is below a predetermined threshold, adding the signal to noise ratio power to the next most recent measured signal to noise ratio power, until the sum of said signal to noise ratio powers reaches said predetermined first threshold;
  if there are no more measured signal to noise ratio powers and said sum of said most recent measured signal to noise ratio powers is below a second threshold, disregarding said sum of said signal to noise ratio powers; and
  if said sum of said signal to noise ratio powers reaches said first threshold or if there are no more measured signal to noise ratio powers and said sum of said most recent measured signal to noise ratio powers reaches a second threshold, deriving a composite attribute result based at least in part on a weight of each signal to noise ratio power associated with said measured attribute.

16. The method according to claim 15 wherein said calibration signal is transmitted through the air.

17. The method according to claim 15 wherein said most recent measured signal to noise ratio power was measured within a predetermined amount of time.

18. The method according to claim 15 wherein said attribute is a phase delta.

19. The method according to claim 15 wherein said attribute is a gain ratio.

20. The method according to claim 15 wherein said attribute is a delay.

* * * * *